(12) United States Patent
Shitomi

(10) Patent No.: US 7,783,608 B2
(45) Date of Patent: Aug. 24, 2010

(54) METHOD AND APPARATUS FOR NAS/CAS INTEGRATED STORAGE SYSTEM

(75) Inventor: Hidehisa Shitomi, Mountain View, CA (US)

(73) Assignee: Hitachi, Ltd., Tokyo (JP)

( * ) Notice: Subject to any disclaimer, the term of this patent is extended or adjusted under 35 U.S.C. 154(b) by 390 days.

(21) Appl. No.: 11/836,545

(22) Filed: Aug. 9, 2007

(65) Prior Publication Data

US 2009/0043828 A1 Feb. 12, 2009

(51) Int. Cl.
*G06F 17/30* (2006.01)
(52) U.S. Cl. ........................ 707/667; 707/673
(58) Field of Classification Search ............... 707/200, 707/661, 667, 673
See application file for complete search history.

(56) References Cited

U.S. PATENT DOCUMENTS

2005/0138081 A1* 6/2005 Alshab et al. ............... 707/200
2008/0155214 A1 6/2008 Shitomi

OTHER PUBLICATIONS

M. Kazar, Spinserver Systems and Linux Compute Farms, NetApp, Feb. 2004, http://www.netapp.com/library/tr/3304.pdf.
Acopia, Product Overview, http://www.acopia.com/products/, retrieved on Aug. 28, 2008.

* cited by examiner

*Primary Examiner*—Hosain T Alam
*Assistant Examiner*—Johnese Johnson
(74) *Attorney, Agent, or Firm*—Sughrue Mion, PLLC

(57) ABSTRACT

Storage system and method are provided which integrate CAS name space with NAS name space in GNS. The storage system implements archive application functionalities, such as: 1) The name space of CAS can be integrated with NASs under GNS; 2) The storage system is equipped with CAS interface to receive the CAS command from an archive application; 3) The storage system is equipped with index creation and search functionalities; during file archiving from NAS to CAS, a detailed indexing is created; 4) During a file archiving from NAS to CAS, default metadata for the archived file is added; and 5) During a file restore, the storage system can maintain a pointer to the location on CAS, and the pointer is used at a file re-archiving to utilize original metadata and index for the re-archiving file.

19 Claims, 14 Drawing Sheets

Fig. 5

Metadata Management Table

| GNS Path | CAS Node | CAS Path | Default Metadata | | Custom Metadata | |
|---|---|---|---|---|---|---|
| | | | Retention | ... | Importance | ... |
| /gns/a/a.doc | CAS1 | /a/a.doc | 5 years | | Mid | |
| /gns/b/b.doc | CAS1 | //b/b.doc | 7 years | | High | |

Fig. 6

[Archive Request]

| Step | ID |
|---|---|
| Archive application requests archiving a file on GNS through CAS I/F program. | 10010 |
| CAS I/F program invokes metadata management program. | 10020 |
| Metadata management program adds default metadata to an archived file in addition to designated metadata by the archive application. | 10030 |
| Metadata management program invokes migration program. | 10040 |
| Migration program copies the file from designated path on GNS to an appropriate location on CAS. And also, it writes the default and custom metadata for the file to CAS via CAS I/F. And then, the migration program changes a file attribute as read only. | 10050 |
| Migration program registers a location of the file on CAS, and default and custom metadata into metadata management table. | 10060 |
| Migration program invokes Index/Search program. | 10070 |
| Index/Search program creates detailed index. | 10080 |

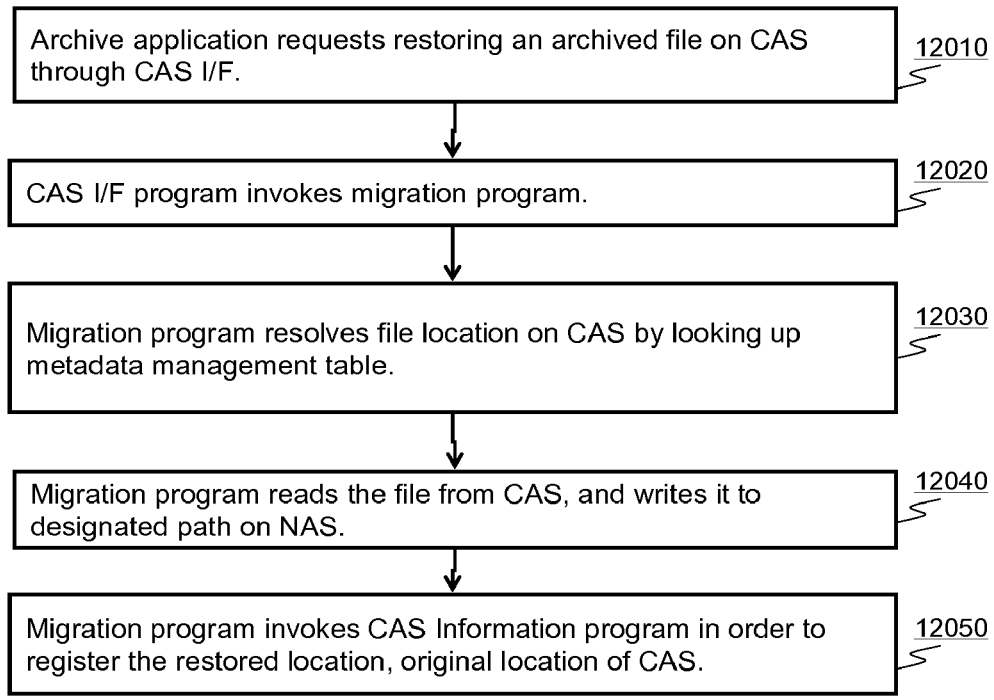

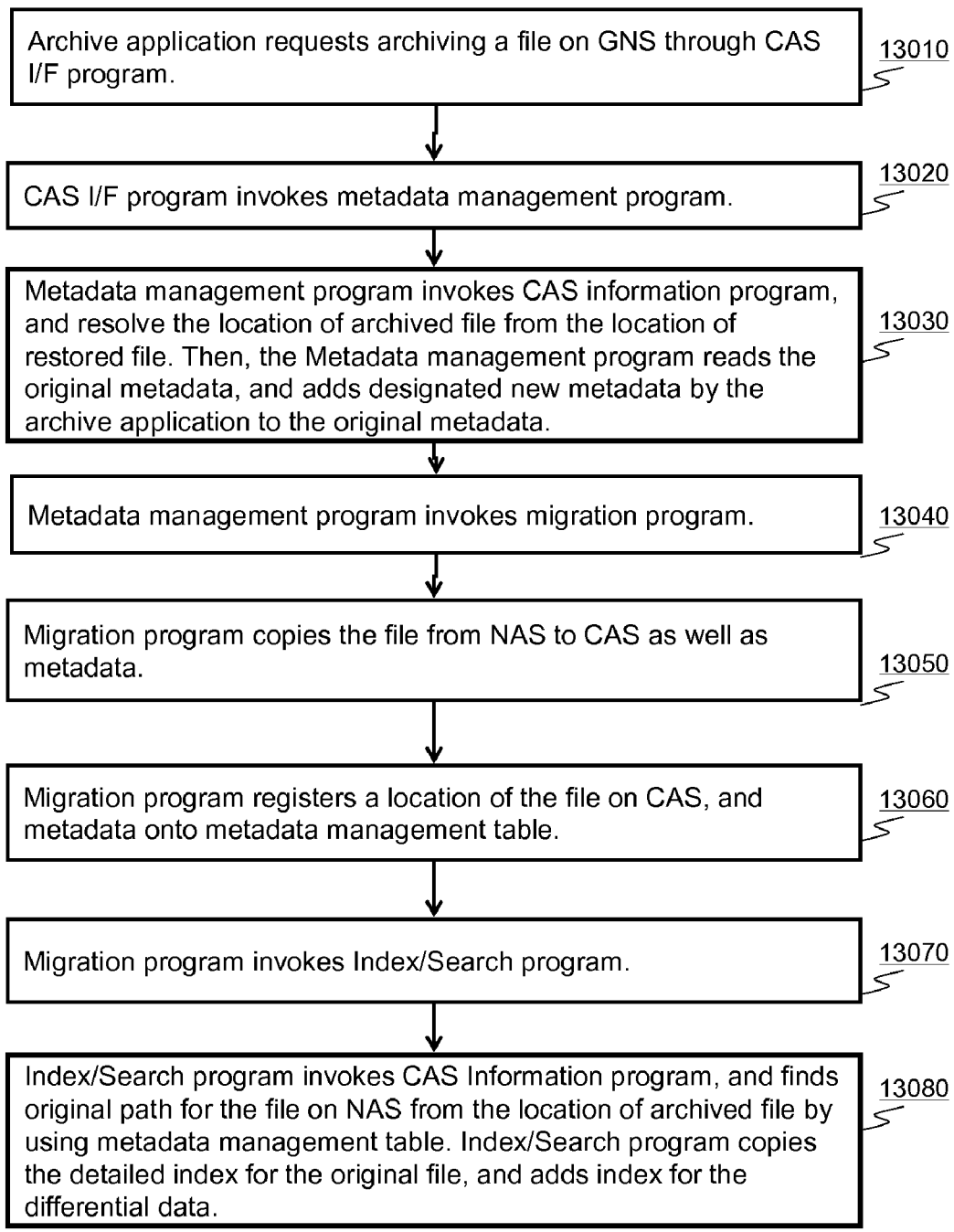
[Re-archive Request] Fig. 10

[Restore Request] Fig. 13
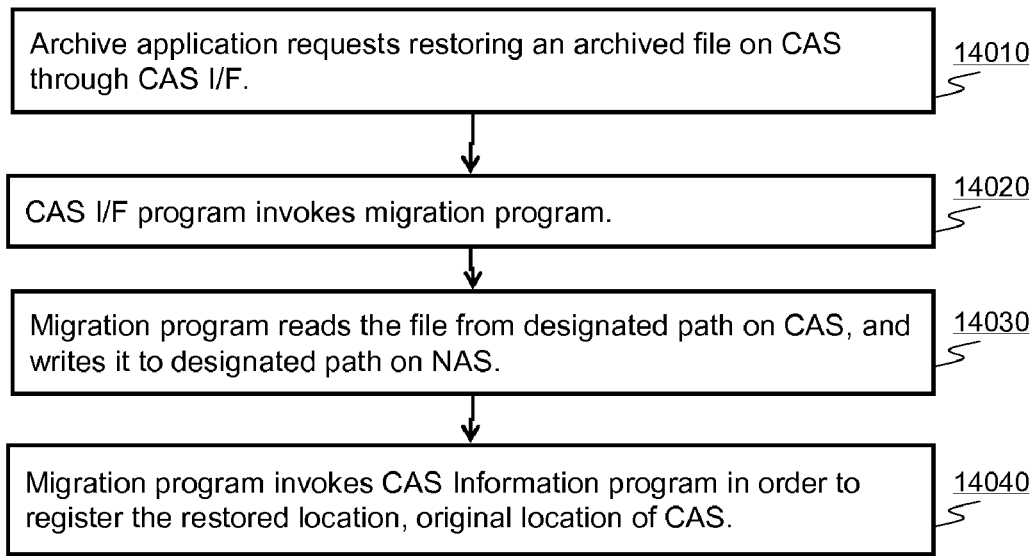
[Restore Request] Fig. 15
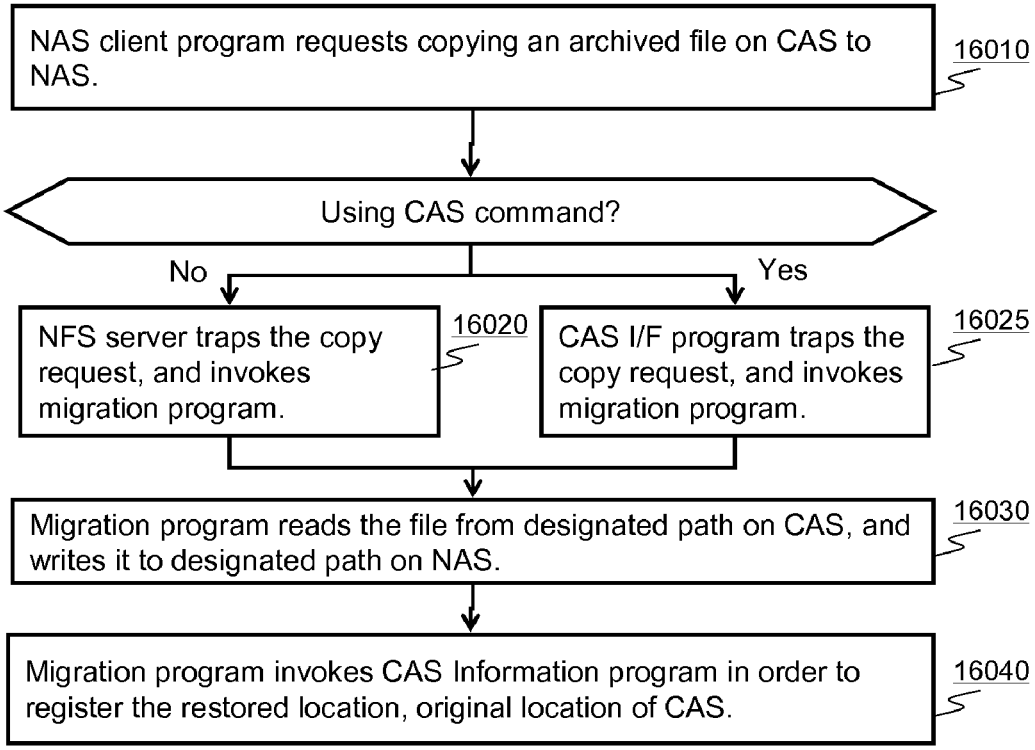

[Re-archive Request] Fig. 14
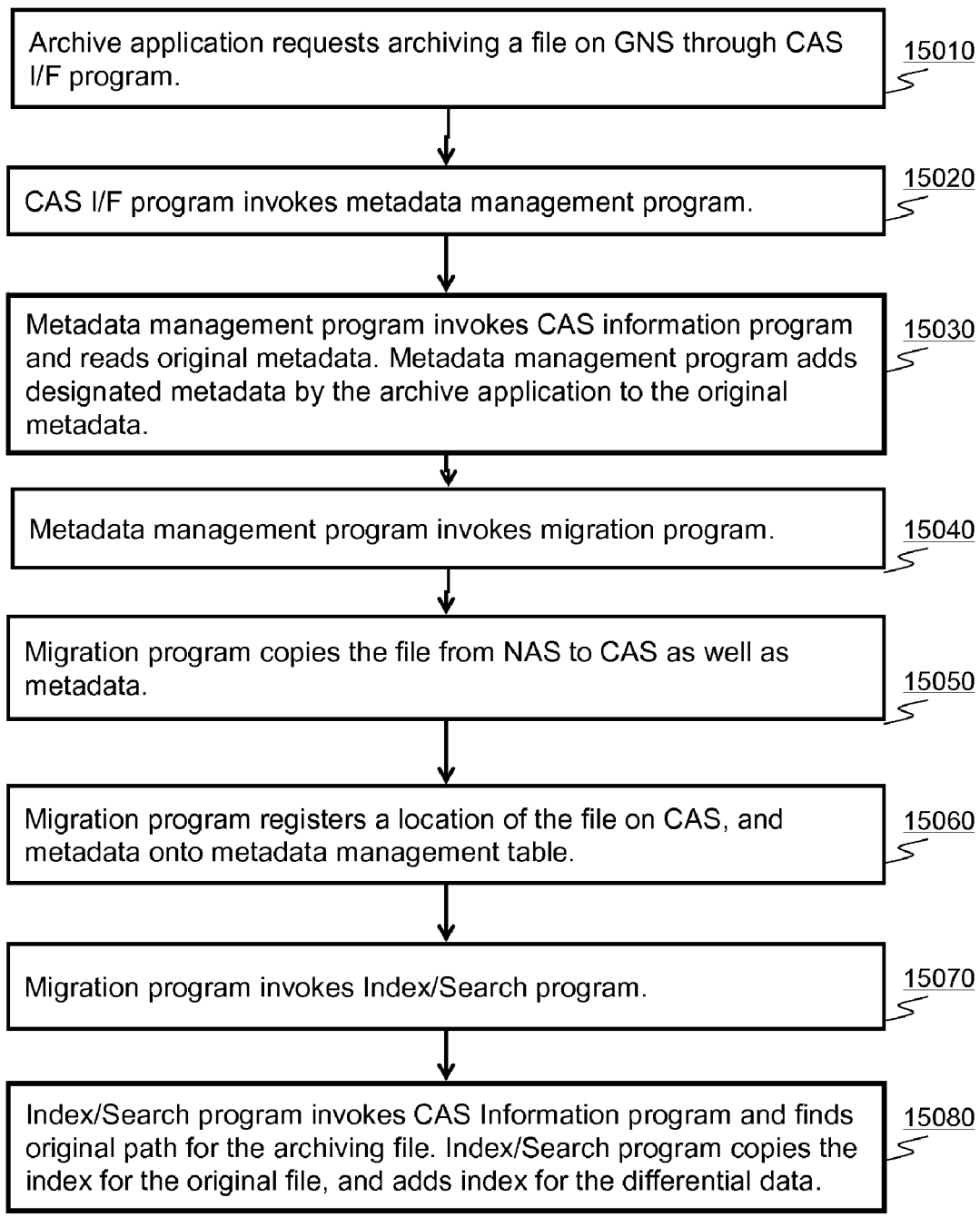

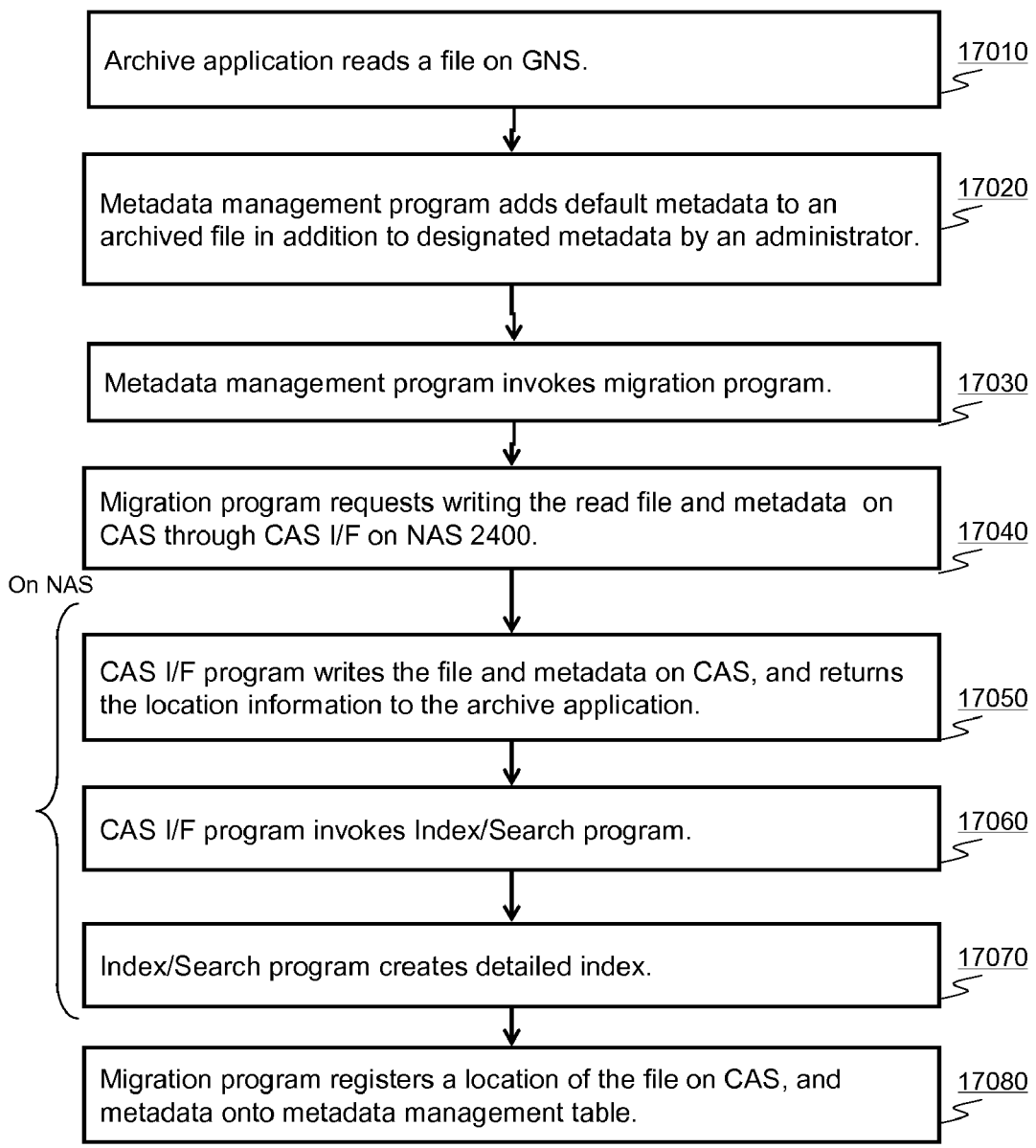

METHOD AND APPARATUS FOR NAS/CAS INTEGRATED STORAGE SYSTEM

FIELD OF THE INVENTION

The present invention relates generally to storage systems and, more specifically, to storage systems known as Network Attached Storage (NAS) and Contents Addressable Storage (CAS).

DESCRIPTION OF THE RELATED ART

Network Attached Storage refers to dedicated data storage technology which can be connected directly to a computer network to provide centralized data access and storage to heterogeneous network clients. NAS is different from the traditional file serving and Direct Attached Storage, in that NAS are server appliances. The operating system and other software on the NAS unit provide only the functionality of data storage, data access and the management of these functionalities, usually via NFS, CIFS, or HTTP. NAS systems usually contain one or more hard disks, often arranged into logical, redundant storage containers or RAIDs (redundant arrays of independent disks), as do traditional file servers. NAS removes the responsibility of file serving from other servers on the network and can be deployed via commercial embedded units or via standard computers running NAS software. NAS uses file-based protocols such as NFS (popular on UNIX systems) or SMB (Server Message Block) (used with MS Windows systems).

The Global Name Space (GNS) facility allows clients to access files without knowing their physical location (using a logical location which is GNS pathname). The GNS also enables network administrators to aggregate file storage across heterogeneous, geographically distributed storage devices and to view and manage it as a single file system. Managing storage may necessitate migration of stored files due to, e.g. capacity management, load balancing, NAS replacement, and data life cycle management. Such migration needs to be performed without disruptions to the client. As explained above, the GNS provides a functionality that integrates multiple file systems provided by NASs into one single name space and provides the name space to NAS clients. Therefore, by utilizing GNS, the system administrators can migrate a file system from one NAS node to another NAS node without client disruptions, i.e., the clients do not know that the migration took place and do not have to change the mount point.

Content-addressable storage (CAS), also referred to as associative storage, is typically used for archiving, e.g., retrieval of fixed content, such as medical images (e.g., x-ray) and documents stored for compliance with government regulations. CAS systems generally provide restricted access, protection from tampering, and detection of tampering. For example, retention management algorithm manages stored data according to a retention policy. The system may employ write once read many (WORM) data management. Additionally, detection of any tampering with stored data can be done using hash values calculated for each stored file. Access may be controlled using account management and data may be managed using encryption and shredding policies. Search and retrieval capabilities may be enabled using metadata and full text indexing and search.

One feature implemented in some CAS systems is handling of modifications requests to already existing files, which is driven by regulatory compliance policies. This feature is embedded, at least in part, in its file naming scheme. To best understand this feature, a comparison is made to a location-based addressing.

There are two typical file access methods for CAS. One is using general network file system protocol such as Network File System (NFS) or Common Internet File System (CIFS—previously known as Server Message Block or SMB). The other is using contents ID calculated by the file name or its contents.

When information is stored into a CAS system, the system may record a content-based address, which is an identifier uniquely and permanently linked to the information content itself. For example, the CAS system may calculate a hash value using the content, and the identifier of the file is the calculated hash value. A request to retrieve information from a CAS system must provide the content identifier, e.g., the hash value, from which the system can determine the physical location of the data and retrieve it. Because the identifiers are based on content, any change to a data element will necessarily change its content address and thereby flag a change to the document. In nearly all cases, a CAS device will not permit editing data file once it has been stored and will control deletions according to a programmed policy. The data file would be stored in this manner for a set period, referred to as the retention period, which is dictated by the retention policy.

Notably, in case of NFS or CIFS access, the CAS does not have to utilize the content-based addressing, but rather may employ file pathname to access a file. However, in general other functionalities and aspects of the archiving-type storage are maintained. For example, metadata addition and indexing for search is still employed. In this regards, while NAS system utilizes inode metadata information, the CAS system may have additional metadata values, which are stored in the CAS namespace. Similarly, protection against and detection of tempering may be maintained, as well as control of access rights, encryption and shredding policies, etc.

In the current state of the art, GNS integrates the name space of NASs; but CAS cannot be a part of GNS. In either access method (i.e. NFS/CIFS access or content-based addressing), it is possible for GNS to integrate CAS name space with NASs; however, the GNS does not provide the CAS functionalities such as retention management and custom metadata addition. Consequently, the integration of CAS into GNS is just at the name space level and the function level is not integrated.

What is lacking in the art is a technology providing a way to integrate both the naming and functionality of CAS into GNS.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The subject invention provides a method and apparatus for NAS/CAS integrated storage system. Various embodiments of the invention provide a storage system that can integrate the CAS name space with the name space of NAS in GNS. Moreover, to realize the functional integration between NAS and CAS, the inventive storage system implements archive application functionalities. By incorporating the CAS name space into the GNS, the CAS client need not know where files are physically located. Consequently, when an administrator moves files to various physical storage devices, such a move is transparent to the CAS client in the same manner that a NAS file move is transparent to a NAS client when using GNS.

As will be described more fully below, the functionalities provided by various embodiments of the inventive storage system include:

The name space of CAS can be integrated with NASs under GNS created by the inventive storage system.

The NAS storage system is equipped with CAS interface to receive the CAS command from an archive application of the CAS client.

The NAS storage system is equipped with index creation and search functionalities. When a file is archived from NAS to CAS, a detailed indexing is created.

When a file is archived from NAS to CAS, default metadata for the archived file is added by the invented storage system.

During a file restore operation; the storage system can maintain a pointer to the location of metadata or index on CAS, so that the pointer may be used at a file re-archiving so as to utilize original metadata and index for the re-archiving file.

According to embodiments of the invention, a method for managing files stored in a storage system is provided, wherein the storage system includes a content addressable storage (CAS) system and CAS client and network attached storage (NAS) system and NAS client, the method comprising:
  a. providing global name space facility in the NAS system;
  b. providing an archiving application in the CAS client;
  c. providing CAS interface facility in the NAS system;
  d. operating the archiving application to monitor a policy management facility and, when a management event is flagged by the policy management facility, sending a file management request of a target file from the archiving application to the CAS interface;
  e. operating the CAS interface to receive file management requests from the archiving application, interpret the requests, and in response invoke a migration module; and,
  f. operating the migration module to execute the file management request on the target file via the NAS system to thereby provide a GNS path to the target file.

The method may further comprise providing a metadata management facility and, upon receiving the file management request invoking the metadata management facility to insert default metadata and designated metadata to the target file. The method may further comprise incorporating the designated metadata in the file management request to thereby provide the designated metadata to the metadata management facility. The method may further comprise using the metadata management facility to maintain a metadata management table. The method may further comprise for each file maintaining in the metadata management table at least the entries comprising GNS path, CAS node, CAS oath, default metadata, and custom metadata. The method may further comprise providing an index/search facility and upon receiving a file management request invoking the index/search facility to create an index for the target file. The file management request may comprise a file archiving of the target file, and the method further comprises operating the NAS system to store an archive copy of the target file from an original NAS storage location to a target archive location on the CAS system via the GNS facility, and storing in the metadata table a GNS path to the target location. The method my further comprise modifying an editing attribute of the archive copy to a read only attribute. The method may further comprise sending from the archiving application a subsequent file management request comprising a file restore of the archive copy, and operating the NAS system to store a restored copy of the archive file from the target archive location to a target restore location on the NAS system via the GNS facility, wherein the target restore location is different from the original NAS storage location. When the file management request comprises a file restore of the archive copy, the method may further comprise storing a pointer to metadata and index of the archive copy. The method may further comprise sending from the archiving application a subsequent file management request comprising a file re-archiving of the restored copy, and operating the NAS system to store a re-archive copy of the restored file from the target restore location to a target re-archive location on the CAS system via the GNS facility, wherein the target re-archive location is different from the target archive location. Upon re-archiving of the restored copy, the pointer is utilized to fetch the metadata and index of the archive copy, and the metadata and index of the archive copy are modified to reflect edits embodied in the re-archived copy.

According to other embodiments of the invention, a network attached storage (NAS) system is provided, enabling storage of files using global name space (GNS) and maintaining content addressable storage (CAS) policy, the system comprising: a network interface for exchanging communication with network clients;
a storage interface for exchanging communication with a storage controller; a processor for executing file management operations; a NAS virtualizer providing a GNS facility; a CAS interface for receiving file management requests for target files from a CAS archive application, and causing the processor to execute the file management requests on the target files to generate managed files, and providing GNS path for each managed file by the NAS virtualizer. The storage system may further comprise an index/search module generating an index for each managed file. The storage system may further comprise a migration module, the migration module being invoked upon receiving each of the file management request to execute copying of the target file. The storage system may further comprise a metadata management module providing default metadata and designated metadata to each of the managed files. The storage system may further comprise a metadata table storing metadata, CAS path, and GNS path of each of the managed files. Each of the file management requests may comprise one of file archiving, file restoration, and file re-archiving.

According to further embodiments of the invention, a networked storage system enabling storage of files using global name space (GNS) and maintaining content addressable storage (CAS) policy is provided, comprising:
  a network attached storage (NAS) system comprising:
    a plurality of storage volumes;
    a storage controller managing operation of the plurality of storage volumes;
    a NAS head managing files stored in the plurality of storage volumes, the NAS head comprising a GNS facility providing a GNS path for each file managed by the NAS head, the NAS head further comprising a CAS interface receiving and interpreting file management requests from CAS clients;
  a CAS system comprising a plurality of CAS storage volumes;
  a CAS client comprising a policy management facility managing CAS files stored in the CAS storage volumes, the CAS client further comprising an archive application monitoring the policy management facility and providing file management requests to the NAS system.

The NAS head may further comprise at least one of:
a metadata management module providing default metadata and designated metadata to each managed file;
a metadata table storing metadata, CAS path, and GNS path of each of the managed files;
an index/search module generating an index for each managed file; and,
a migration module migrates a file from NAS to CAS or from CAS to NAS.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5 illustrates an example of the metadata management table.

FIG. 6 illustrates an example of control procedure for archiving a file based on the configuration of FIG. 4.

FIG. 8 illustrates a typical example of CAS Information table managed by CAS information program to store the information.

FIG. 9 illustrates an example of control procedure of restoring an archived file from CAS to NAS base on the configuration of FIG. 7.

FIG. 10 illustrates an example of control procedure of re-archiving a restored file from GNS to CAS based on the configuration of FIG. 7.

FIG. 13 illustrates an example of control procedure of restoring an archived file from CAS to NAS base on the configuration of FIG. 12.

FIG. 14 illustrates an example of control procedure of re-archiving a restored based on the configuration of FIG. 12.

FIG. 15 illustrates an example of another control procedure of restoring an archived file from CAS to NAS base on the configuration of FIG. 12.

FIG. 17 illustrates an example of control procedure of file archiving based on the configuration of FIG. 16.

The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

DETAILED DESCRIPTION

According to features of the invention, methods and systems are provided to enable integration of CAS addressing into NAS addressing in GNS, while maintaining CAS functionality. As can be understood from the discussion of the background, such functionality may be critical, especially when using the CAS storage for regulatory compliance. On the other hand, any management performed by the network administrator must remain transparent to the user. The manner in which these goals are achieved by the invention will now be explained using exemplary embodiments of the invention.

Figure 1:
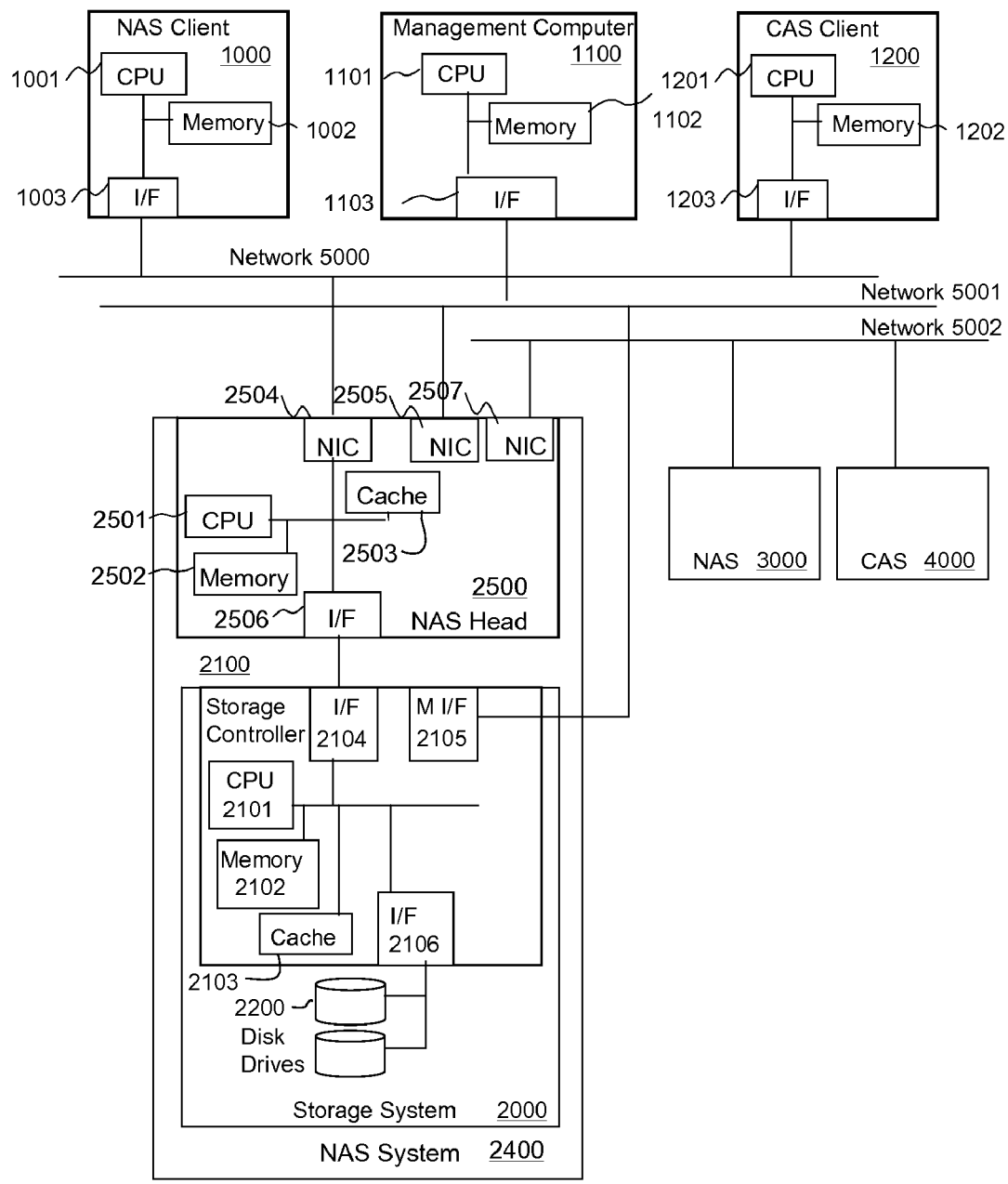
FIG. 1 illustrates an example of hardware configuration in which embodiments of the method and apparatus of the invention may be applied.

FIG. 1 shows an example of physical hardware architecture suitable for implementing embodiments of the invention. The system is composed of NAS Clients 1000, Management Computer 1100, CAS Client 1200, NAS Systems 2400, 3000, and CAS System 4000. The structure and operation of these elements are as follows.

NAS Clients 1000: Application and NFS (Network File System) client software (not shown) is running on a CPU 1001. The NAS clients use Network Interface (I/F) 1003 to connect to NAS Systems 2400, which creates Global Name Space and virtualizes NASs via Network 5000. The Network 5000, 5001, and 5002 can be either physically separate network or logically separate network by utilizing network partitioning technology such as VLAN. The typical media of the network 5000 is an Ethernet. The NAS clients 1000 can be directly connected to the NAS Systems 3000. In this case, the NAS clients cannot share the NAS virtualization facility provided by NAS System 2400.

CAS Clients 1200: Archive application and NFS client software or proprietary communication software (not shown) is running on a CPU 1201. The CAS clients use Network Interface (I/F) 1203 to connect to NAS Systems 2400, which creates Global Name Space and virtualizes NASs via Network 5000. The CAS clients can be directly connected to the CAS Systems 4000. In this case, the CAS clients cannot share the NAS virtualization facility provided by NAS System 2400.

Management Computer 1100: Management Software (not shown) is running on a CPU 1001. The Management Computer uses network interface (I/F) 1103 to connect to the NAS Head 2500 and Storage Systems 2000 via Network 5001.

NAS System 2400 Consists of Mainly Two Parts: NAS Head 2500 and Storage System 2000. The storage system 2000 consists of a Storage Controller 2100 and Disk Drives 2200. NAS Head 2500 and storage system 2000 can be connected via interfaces 2506 and 2104. NAS Head 2500 and storage system 2000 can exist in one storage unit, called Filer. In such a case, the two elements are connected via system bus such as PCI-X. Moreover, the NAS head can include internal disk drives without connecting any storage controller, which is quite similar to the general-purpose server. On the other hand, the NAS Head and controller can be physically separated. In such a case, the two elements are connected via network connections such as Fibre Channel or Ethernet. Although there are various hardware implementations, any implementations can be applied for the purpose of the subject invention.

The NAS Head 2500 comprises CPU 2501, memory 2502, cache 2503, Front-end network interface (NIC) 2504, management network interface (NIC) 2505, disk interface (I/F) 2506, and backend network interface (NIC) 2507. The NICs 2504, 2505, and 2507 can be either physically separate or logically separate interfaces. The NAS head 2500 processes requests from the NAS clients 1000, Management Host 1100, and CAS Client 1200.

CPU 2501 and Memory 2502: The program to process NFS requests or other operations is stored in the memory 2502 and CPU 2501 executes the program.

Cache 2503: It temporally stores NFS write data from NAS clients 1000 before the data is forwarded into the storage system 2000, and NFS read data that are requested by the NAS clients 1000. It may be, e.g., a battery backed-up non-volatile memory. In another implementation, memory 2502 and cache memory 2503 are commonly combined by partitioning a single memory device.

Front-End Network Interface 2504: It is used to connect both between NAS clients 1000, CAS clients 1200 and NAS Head 2500. The Ethernet is a typical example of the connection.

Management Network Interface 2505: It is used to connect both between management computer 1100 and NAS Head 2500. The Ethernet is a typical example of the connection.

Disk Interface 2506: It is used to connect between NAS head 2500 and storage system 2000. The Fibre Channel (FC) and Ethernet are typical examples such connection. In the case of internal connection between NAS head and the controller (i.e. single storage unit implementation), system bus is a typical example of the connection.

Backend Interface 2507: It is used to connect both between NAS Head 2500 and NAS systems 3000 and CAS systems 4000 which are virtualized by NAS System 2400. The Ethernet is a typical example of the connection.

The storage controller 2100 comprises CPU 2101, memory 2102, cache memory 2103, front-end interface 2104, management interface (M I/F), and disk interface (I/F) 2106. It processes I/O requests from the NAS Head 2500.

CPU 2101 and Memory 2102: The program to process I/O requests or other operations is stored in the memory 2102, and CPU 2101 executes the program.

Cache Memory 2103: It temporally stores the write data from the NAS Head 2500 before the data is stored into disk drives 2200, and temporarily stores the read data that are requested by the NAS Head 2500. It may be, e.g., a battery backed-up non-volatile memory. In another implementation, memory 2102 and cache memory 2103 are commonly combined by partitioning a single memory device.

Host Interface 2104: It is used to connect between NAS Head 2500 and storage controller 2000. The Fibre Channel (FC) and Ethernet are typical examples of the connection. A system bus connection such as PCI-X can be also applied.

Management Interface (M I/F) 2105: It is used to connect between Management Computer 1100 and storage controller 2000. The Ethernet is a typical examples of the connection.

Disk Interface (I/F) 2106: It is used to connect disk drives 2200 and the storage controller 2000.

Disk Drives 2200: Each of the disk devices processes the I/O requests in accordance with disk device commands such as SCSI commands.

NAS System 3000: The hardware configurations are the same as the NAS System 2400. Although there are various hardware implementations, any implementations can be applied to the invention. The difference between the NAS System 2400 and NAS Systems 3000 just comes from software side.

CAS System 4000: CAS system is typically composed of clustered nodes. The hardware configurations of each node are similar to the NAS System 2400. In another implementation, the cluster nodes which are similar to the NAS head are connected to a single storage system. Although there are various hardware implementations, any implementations can be applied to the invention.

While the above description provide an example of hardware architecture that is suitable for use with the subject invention, those skilled in the art will appreciate that other appropriate hardware architecture can be applied to the invention.

Figure 2:
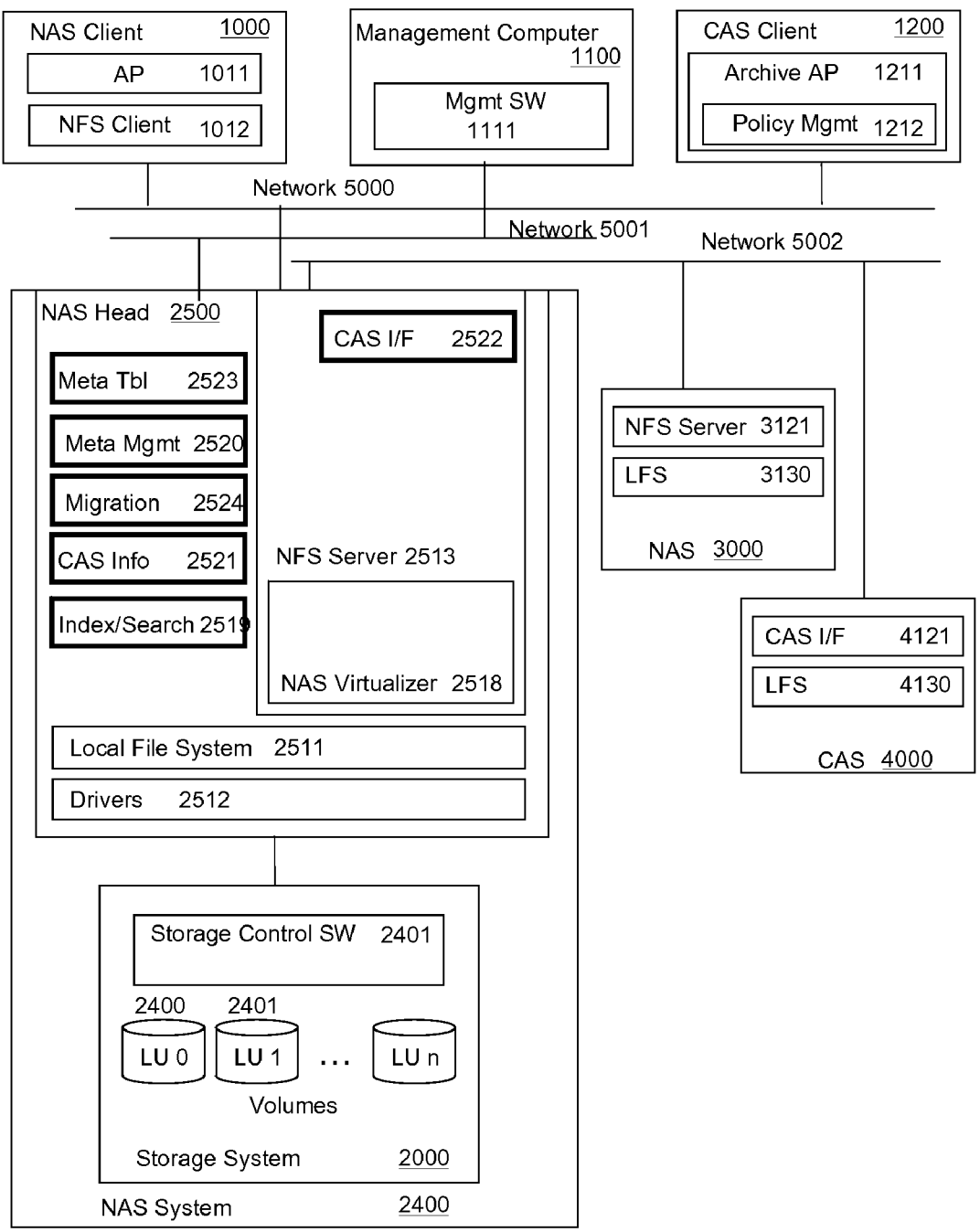
FIG. 2 illustrates an example of software configuration in which embodiments of the method and apparatus of this invention applied.

FIG. 2 shows an example of software configuration in which embodiments of the method and apparatus of this invention may be applied. In this diagram, bold lines represent elements that are new and which enable the embodiments of the subject invention. The system is composed of NAS Clients 1000, Management Computer 1100, CAS Client 1200, NAS System 2400, 3000, and CAS systems 4000. The structure and operation of these elements are as follows.

NAS Clients 1000: NAS client 1000 is a computer on which some application (AP) 1011 generates file-manipulating operations. A Network File System (NFS) client program such as NFSv2, v3, v4, or CIFS 1012 is also on the NAS client node 1000. The NFS client program communicates with an NFS server program on NAS Systems 2400 through network protocols such as TCP/IP. The NFS clients and NAS system are connected via a network 5000 such as LAN.

Management Host 1100: Management software 1111 resides on the Management Computer 1100. NAS management operations such as system configuration settings can be issued from the management software 1111.

CAS Clients 1200: CAS client 1200 is a computer on which archive application (AP) 1211 generates file archiving operations. An administrator can set archiving policies (e.g. timing of archiving) in Policy Management program 1212. A proprietary network communication program or general Network File System (NFS) client program such as NFSv2, v3, v4, or CIFS 1012 also runs on the CAS client node 1200 (not depicted in FIG. 2). The program communicates with a proprietary communication server program or an NFS server program on NAS Systems 2400 through network protocols such as TCP/IP. The CAS clients and NAS system are connected via a network 5000 such as LAN.

NAS System 2400: It consists of mainly two parts: NAS Head 2500 and Storage System 2000.

NAS Head 2500: NAS Head 2500 is a part of a NAS system 2400. Operations to NAS system 2400, 3000, and CAS system 4000 are processed in this module.

NFS server program 2513 communicates with NFS client 1012 on the NAS clients 1000 and CAS clients 1200, and processes NFS operations to the file systems managed by NAS System 2400. The operations to files on the NAS Systems 3000 and CAS Systems 4000 whose files are part of Global Name Space (GNS) can be processed in NFS server 2513.

NAS Virtualizer 2518 is a Global Name Space (GNS) creator with file level migration functionality. NAS Virtualizer is a file related operation virtualization program to the underlying NAS systems such as NAS 3000 and CAS 4000. A detailed description of NAS Virtualization program is provided in U.S. patent application Ser. No. 11/642,525, filed Dec. 21, 2006, the entire disclosure of which is incorporated herein by reference. Several key components of NAS Virtualizer are also explained in the following.

The Forwarder module in NAS Virtualizer 2518 hooks the NFS operations from NFS client 1012 to the NAS Systems 3000, and looks up a file handler in the operations, which includes bits representing a destination of the operation. Then, the forwarder module forwards the operation to the destination NAS system. The destination address can be managed by the Mount Point Management Table.

In addition to the GNS, the file level migration can be done in NAS Virtulizer 2518, and the File Location Table (FLT) can be utilized at the file level migration.

NAS virtualizer aggregates file systems of external NAS, and export them to clients. In addition to the name space of NAS, the name space of CAS can be aggregated with GNS, when CAS employs NFS protocol. Even if the CAS does not employ NFS protocol, and utilized contents ID to identify a file, the name space of CAS can be aggregated with GNS by utilizing flat name space of content ID, which means there is single level of directory and the file name is identical to content ID.

In addition to the NAS virtualizer, in order to integrate CAS name space with GNS, CAS I/F program 2522 is necessary. CAS I/F 2522 program is a CAS command interpreter enabling the NAS system 2400 (which issues the GNS) to communicate with the CAS system 4000. It receives CAS commands such as retention period setting, and metadata addition, and executes the commands. The command can be transferred by general NFS protocol or proprietary protocol.

Metadata Management program 2520 creates and adds default metadata, which is pre-determined by an administrator. It also manages the location of metadata on the CAS system.

Metadata Management table 2523 stores an association of file location between NAS and CAS, and metadata of the file. The table can reside on the memory or disk drives of NAS System 2400.

Migration program 2524 copies a file either from NAS to CAS, or CAS to NAS.

Index/Search program 2519 creates index for searching, and executes a search. The index can be created by either metadata or full text. The index can reside on the memory or disk drives of NAS System 2400. The timing of indexing is varied. One option is the time of file write. The other option is batch operation at designated timing. One feature of the invention is the timing of the file migration from NAS to CAS. At the time, the detailed indexing (e.g. full text indexing) is done, because archive application might need more detailed search than NAS client. The search functionalities can be called from any applications on NAS clients, CAS clients, and management software.

CAS Information program 2521 stores file location on CAS when the file copied from CAS to NAS in order to utilize its metadata and detailed index at re-archiving. The information can be stored on the memory or disk drives of NAS System 2400.

The local file system 2511 processes file I/O operations to the file systems on the storage system 2000.

Drivers of storage system 2512 translate the file I/O operations to the block level operations, and communicate with storage controller 2000 via SCSI commands.

Storage System 2000: A storage control software 2401 processes SCSI commands from NAS head 2400. File systems are created in volumes 2400 and 2401, which are composed of one or more disk drives 2200 (FIG. 1).

NAS System 3000: The software configuration is similar to the NAS System 2400 except that in this example NAS System 3000 does not have the functionalities of NAS virtualization. NFS server 3121 resides in NAS system 3000 in order to communicate with NAS System 2400. The NFS server 3121 can communicate with NFS client 1012 on the NAS clients 1000. In such a case, the operations are sent to the file systems which are not a part of GNS. The local file system 3130 processes file I/O operations to the storage system in NAS system 3000, and drivers of storage system translate the file I/O operations to the block level operations, and communicate with storage controller via SCSI commands.

CAS System 4000: CAS I/F program 4121 resides on each cluster node in order to receive and process CAS commands. CAS commands can be transferred from NAS system 2400, and archive application 1211 on CAS client 1200. The local file system 4130 processes file I/O operations to the storage system in CAS system 4000, and drivers of storage system translate the file I/O operations to the block level operations, and communicate with storage controller via SCSI commands.

Figure 3:
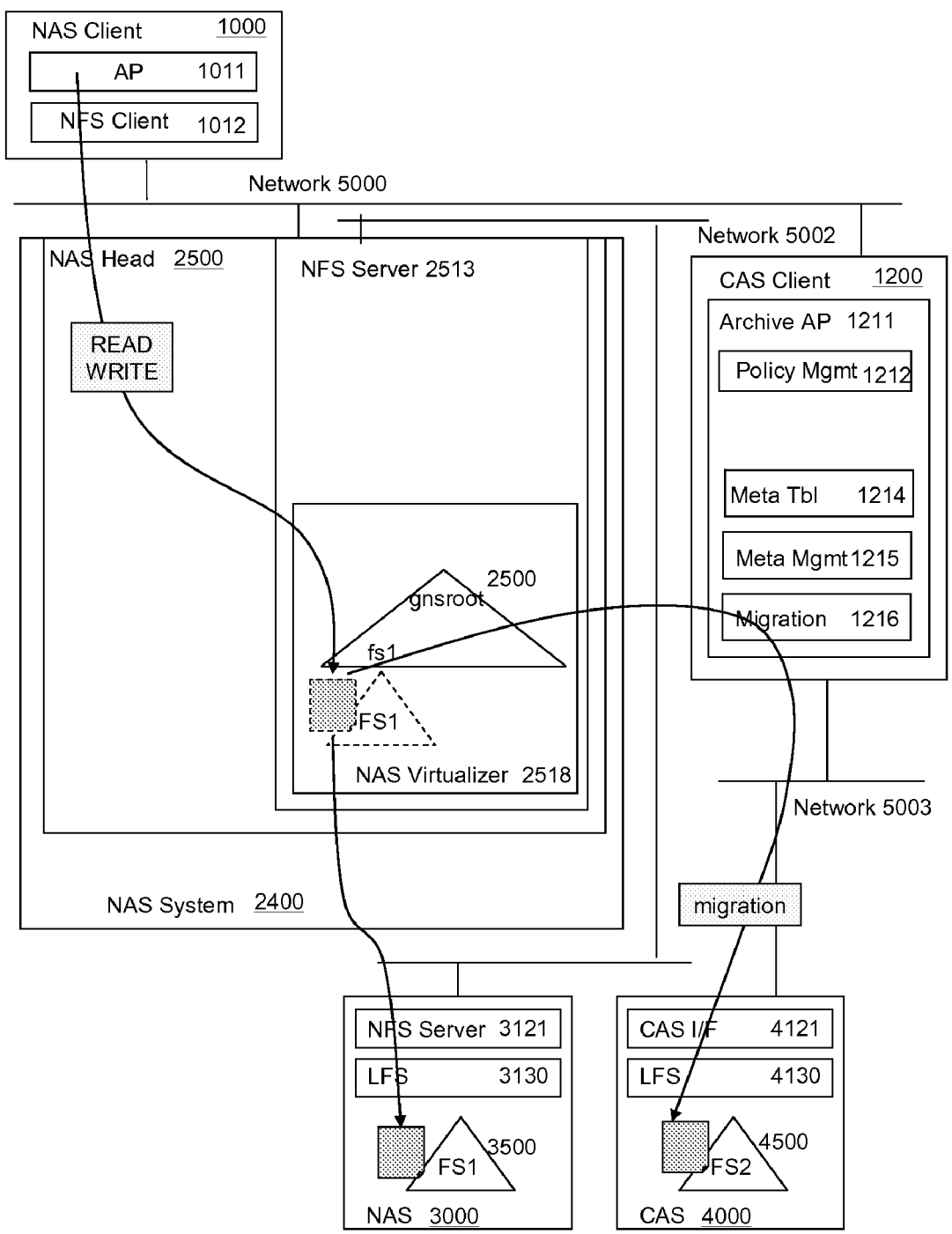
FIG. 3 illustrates a conceptual diagram of existing method of file archiving.

As noted above, in the prior art the Global Name Space is constructed by multiple file systems of multiple NASs. On the other hand, CAS has a separate name space. Therefore, in the prior art when an archiving operation is executed, an archiving application 1211 needs to mount both the GNS 2500 and the CAS name space 4500, and then move a file from NAS 2400 to CAS 4000. FIG. 3 represents a conceptual diagram of existing method of file archiving, wherein the solid-line triangle FS1 represent the physical space storing the file, while the broken-line triangle FS1 represent the logical space of the file system. As shown, NAS client 1000 writes and reads a file into the NAS virtualizer 2518, which generates the GNS for the file and stores it at a physical storage location in NAS 3000 device. When the file needs to be archived, it is copied onto the CAS 4000 device according to the following process.

1. Policy management program 1212 invokes migration program 1216 based on the file archiving policies, which an administrator inputted. For example, the policy may dictate periodical archiving every defined period.
2. Migration program 1216 copies the file from GNS 2500 to the designated location on CAS 4000 through the CAS I/F 4121. The CAS commands are transferred to the CAS I/F via general NFS protocol or proprietary network protocol. During the migration, some metadata is added by metadata management program 1215. Moreover, some archive application can include or call index and search program at an external server. The index and search program generates detailed index for the file. The index will be used when the search request is issued.
3. After finishing the migration, the migration program 1216 registers the file location on CAS 4000 (e.g. path name or contents ID) into the metadata management table 1214.

To contrast with the above prior art archiving process, a first embodiment will now be discussed, illustrating NAS/CAS integration with Global Name Space in a case where the clients cannot see the CAS device. In this embodiment the name space of CAS can be integrated with the GNS and the archiving is done by the NAS system according to a request from a CAS client. According to this embodiment the archiving application 1211 does not have to be aware of both GNS and the name space of CAS. While in this embodiment the name space of CAS 4500 is not seen in GNS 2500 from the NAS client 1000 and CAS client 1200, the NAS system 2400 can mount the name space of CAS, and generate CAS command to the CAS system 4000.

Figure 4:
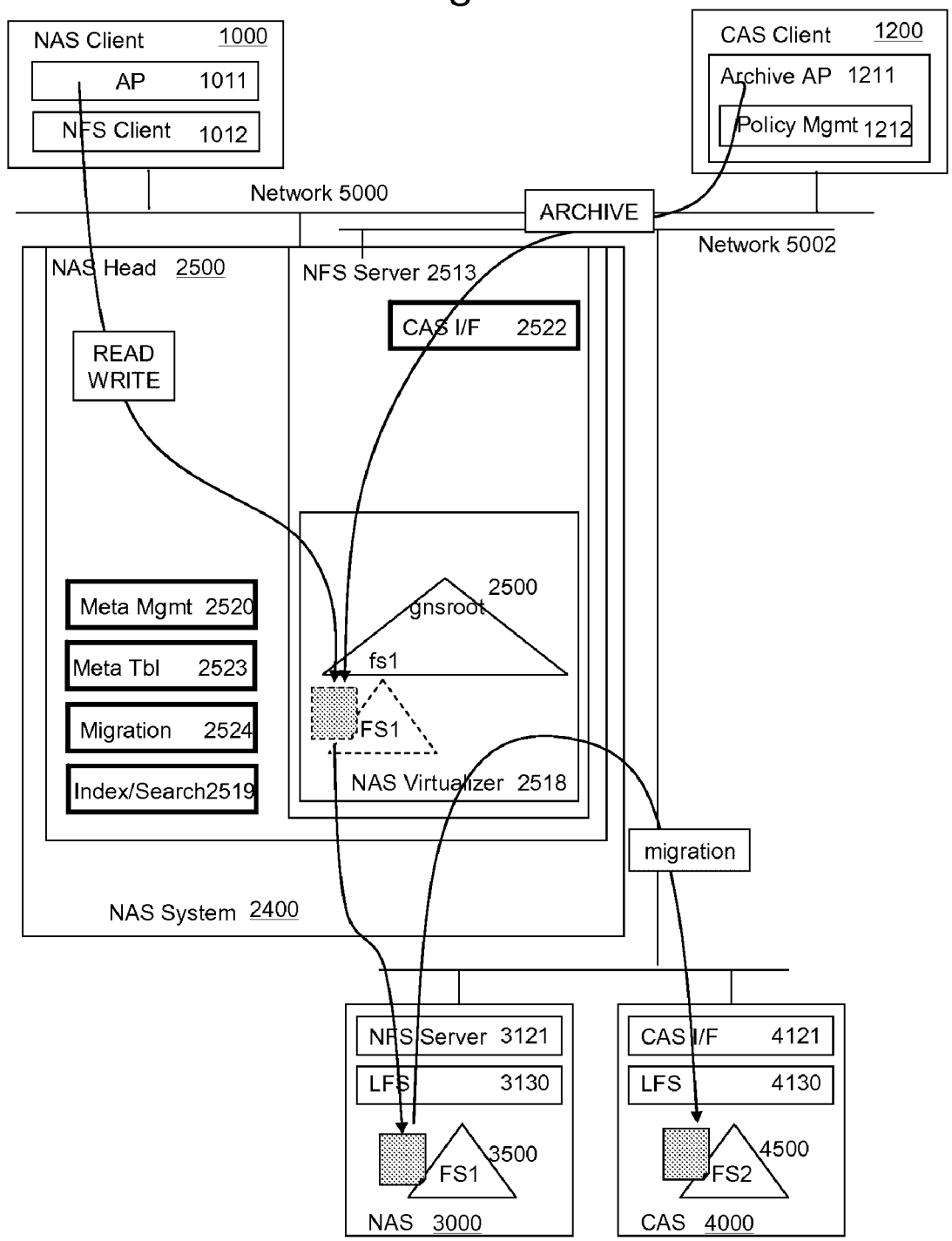
FIG. 4 illustrates a conceptual diagram of archiving a file using the invention.

FIG. 4 shows a conceptual diagram of archiving a file using the first embodiment of the invention. As in FIG. 3, a file system 1 (FS1) is stored at NAS 3000 having an addressed generated by GNS 2500. The NAS client application 1011 on NAS 1000 and archive application 1211 on CAS client 1200 can access a file in the FS1 via the path of "/gnsroot/fs1/". The archive target of the FS1 is file system 2 (FS2) or name space 2 at CAS 4000. As described before, there are two typical addressing methods of CAS. One method is using directory path same as the general NAS method. The other method is using content ID, which can be seen as flat namespace with a single level of directory. The path name and file name can be used for the typical calculation of the content ID (e.g., hash value).

FIG. 6 shows an example of control procedure for archiving a file based on the configuration of FIG. 4. Notably, in this embodiment the migration is performed by the NAS system 2400, rather than the CAS client (as was done in the prior art). Moreover, during the migration the NAS system also adds metadata required by the CAS system (e.g., retention policy) and performs index/searching operations required by the CAS system.

1. Based on archiving policies 1212 which an administrator set at the CAS client 1200, archive application 1211 requests the NAS system 2400 to archive a file on GNS through CAS I/F program 2522 (Step 10010). The typical parameters of the archiving command are retention period, file path name on GNS, target path name on CAS (optionally), and custom metadata for archiving. The archive request can be a special proprietary command or customized command of NFS. In either case, the NFS server 2513 has to have some CAS command interpretation program, which in this embodiment is CAS I/F 2522. Unlike the prior art, the archive application requests the archive operations to be performed by the NAS System 2400, and the NAS System 2400 archives a file instead of the archive application of the CAS system.
2. When CAS I/F program 2522 receives the archive request, it invokes metadata management program 2520 (Step 10020).
3. Metadata management program 2520 adds default metadata to an archived file in addition to designated metadata by the archive application 1211 (Step 10030). The default metadata may be pre-determined by an administrator, e.g., retention time, data protection type, shredding type, etc.
4. Metadata management program 2520 invokes migration program 2524 (Step 10040).
5. Migration program 2524 copies the file from the designated path on GNS 2500 to an appropriate location on CAS 4000. The target location on CAS can be specified by an archive application 1211 or some default place such as the same path name as the original file on GNS (e.g. "/gnsroot/fs1/a.doc"->"/fs1/a.doc"). Migration program 2524 also writes the default and custom metadata (e.g. user defined metadata for helping search) for the file to CAS 4000 via CAS I/F 4121. Then, the migration program changes a file attribute as read only (Step 10050). Here the migration program copies the file from NAS to CAS, and changes the file attributes as read only. However, the migration program can move the file from NAS to CAS, and leaves a stub file or manages file location information similar to the File Location Table on NAS virtualizer. Since the file is moved, the available capacity of NAS 3000 can be increased. In this case, when the NAS client reads the archived file, the migration module hooks the NFS read operation, interprets the file location on CAS by looking up metadata management table or other location information table, and reads from CAS.
6. Migration program 2524 registers the location of the file on CAS 4000, and default and custom metadata into metadata management table 2523 (Step 10060). FIG. 5 represents an example of the metadata management table according to an embodiment of the invention. As shown in FIG. 5, for each file the metadata management table includes entries for a GNS path, CAS node, CAS path, default metadata, and custom metadata. Since the archived file is listed in a GNS path column, it can now be addressed by using the GNS of the file in addition to its CAS path.
7. Optionally for this embodiment, the migration program 2524 might return the location of the file on CAS to the archive application 1211. Then, CAS client can keep managing the location of archived file.
8. Migration program 2524 then invokes Index/Search program 2519 (Step 10070).
9. Index/Search program 2519 creates detailed index such as full text index instead of metadata index (Step 10080). After the file is archived, it might be used in various ways such as auditing, for which the detailed indexing might be helpful to an administrator.

There are various circumstances upon which an administrator might want to see the archived files. However, the I/O throughput of CAS system is usually slower than that of NAS system. Moreover, there are circumstances upon which the administrator might want to edit the archived files. To perform such operations the archived files should be restored to NAS. In the prior art, archive application 1211 has to read an archived file from CAS 4000 via CAS I/F, and then write the file on some different location from the original file location of GNS 2500 via NFS protocol. On the other hand, according to one embodiment of the invention, the archive application 1211 just sends a restoring request from the NAS system 2400. Moreover, the pointer to the metadata and detailed index can be remembered for re-archiving if needed.

Figure 7:
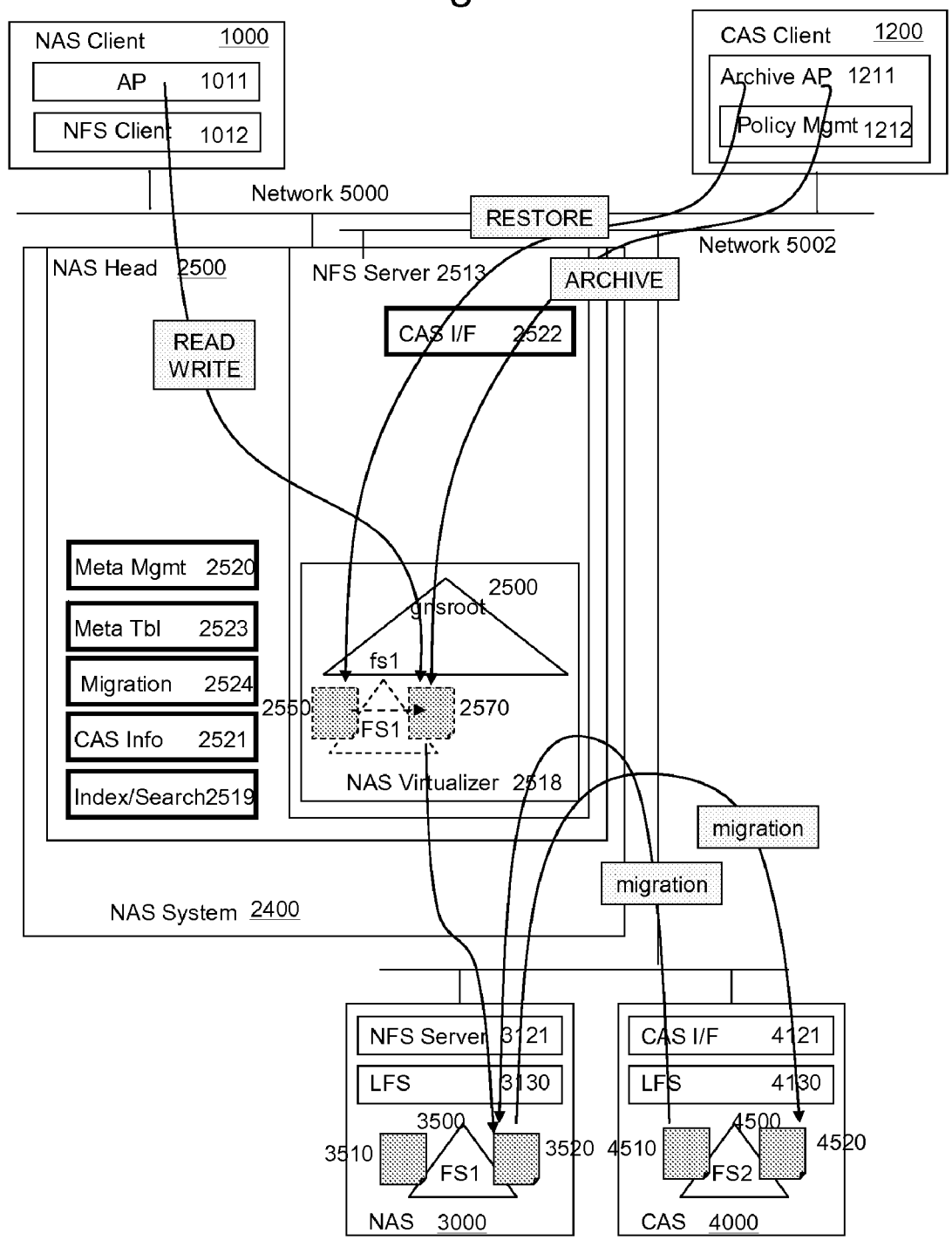
FIG. 7 illustrates a conceptual diagram of restoring an archived file using an embodiment the invention.

FIG. 7 shows a conceptual diagram of restoring an archived file using an embodiment of the invention. A file system 1 (FS1) at NAS 3000 is a part of GNS 2500. The NAS client application 1011 on NAS 1000 and archive application 1211 on CAS client 1200 can access a file in the FS1 via the GNS path of "/gnsroot/fs1/". The archive target of the FS1 is file system 2 (FS2) or name space 2 at CAS 4000. Since the original file 2550 is archived, it should not be updated per the retention policy. Therefore the restoration target location should be different from the original location of the file (i.e., as to prevent overwriting). This is different from backup restoration, wherein the file from the backup storage is restored onto the location of the original file. The archived file 4510 is copied to a different location on 2570 GNS 2500 (e.g. "/gnsroot/fs1/a_recover.doc). In this manner, the restored archive file is separate from the original file. The recovery location can be determined by an archive application 1211 or be pre-determined by an administrator. NAS client application 1011 and archive application 1211 reads and writes the restored file 2570 as the normal file on GNS. That is, the NAS client doesn't need to know the actual storage location of the restored file, but rather only needs its GNS address.

FIG. 9 represents an example of control procedure of restoring an archived file from CAS to NAS base on the configuration of FIG. 7.

1. Archive application 1211 requests restoring an archived file 4510 on CAS 4000 through CAS I/F 2522 of NAS System 2400 (Step 12010). The typical parameters are the file location 2550 on GNS, which had already archived and read only, and restoration target location. Assume that the archive application knows which files were archived (either automatically or by an administrator input).
2. When CAS I/F program 2522 receives restoration request, it invokes migration program 2524 (Step 12020).
3. Migration program 2524 resolves the file location at CAS by looking up metadata management table 2523 (see FIG. 5) by using the file location 2550 of GNS (Step 12030).
4. Migration program 2524 reads the file 4510 from CAS 4000, and writes it to designated path 2570 on GNS (Step 12040).
5. Migration program 2524 invokes CAS Information program 2521 in order to register the restoration location 2570, and the original location or contents ID 4510 of CAS (Step 12050). To do this, the metadata of original file and detailed index can be utilized, and just the differential data (e.g. metadata and index) should be added to the original data at re-archiving. FIG. 8 shows a typical example of CAS Information table managed by CAS information program to store the information. In this case, the table includes entries for GNS path, CAS node and CAS path.
6. Migration program 2524 optionally may return the location of the restored file 2570 on GNS to the archive application 1211.

After completing editing of the restored file, an administrator may want to re-archive the file. FIG. 7 also shows a conceptual diagram of re-archiving a restored file using an embodiment of the invention. The archive of restored file 2570 is almost the same as the normal file archiving. The difference is that the stored metadata and detailed index of original file can be utilized at the creation of metadata and detailed index. Also, the location of the re-archived file on CAS 4000 should be different from the originally archived file if the retention period has not expired. Again, this is done to prevent override of the originally archived file when the retention period has not expired. Depending on the retention policy, the clock for the retention period of the re-archived file may restart upon re-archiving, and may expire after the retention period of the originally archived file.

FIG. 10 shows an example of control procedure of re-archiving a restored file from GNS to CAS based on the configuration of FIG. 7.

1. (Same as 10010) Archive application 1211 requests re-archiving a file 2570 on GNS through CAS I/F program 2522 (Step 13010). The typical parameters of the command are retention period, file path name on GNS, target path name on CAS (optionally), and custom metadata for archiving.
2. (Same as 10020) When CAS I/F program 2522 receives the archive request, it invokes metadata management program 2520 (Step 13020).
3. Metadata management program 2520 invokes CAS information program 2521, and resolves the location of archived file 4510 from the location of restored file 2570. Then, the Metadata management program reads the original metadata, and adds designated new or updated metadata by the archive application to the original metadata (Step 13030).
4. (Same as 10040) Metadata management program 2520 invokes migration program 2524 (Step 13040).
5. (Same as 10050) Migration program 2524 copies the file from designated path 2570 on GNS 2500 to an appropriate location 4520 on CAS 4000 (which is a specified location by CAS client or pre-determined location by an admistrator). Migration program 2524 also writes the default and custom metadata for the file to CAS 4000 via CAS I/F 4121. Then, the migration program changes a file attribute as read only (Step 13050).
6. (Same as 10060) Migration program 2524 registers a location of the file 4520 on CAS 4000, and default and custom metadata into metadata management table 2523 (Step 13060).
7. Migration program 2524 optionally may return the location of the file 4520 on CAS to the archive application 1211.
8. (Same as 10070) Migration program 2524 invokes Index/Search program 2529 (Step 13070).
9. Index/Search program 2519 invokes CAS Information program 2521, and finds the original path for the file 2550 on NAS from the location of archived file 4510 by using metadata management table 2523. Index/Search program may copy the detailed index for the original file 2550, and adds index for the differential data (Step 13080).

Figure 11:
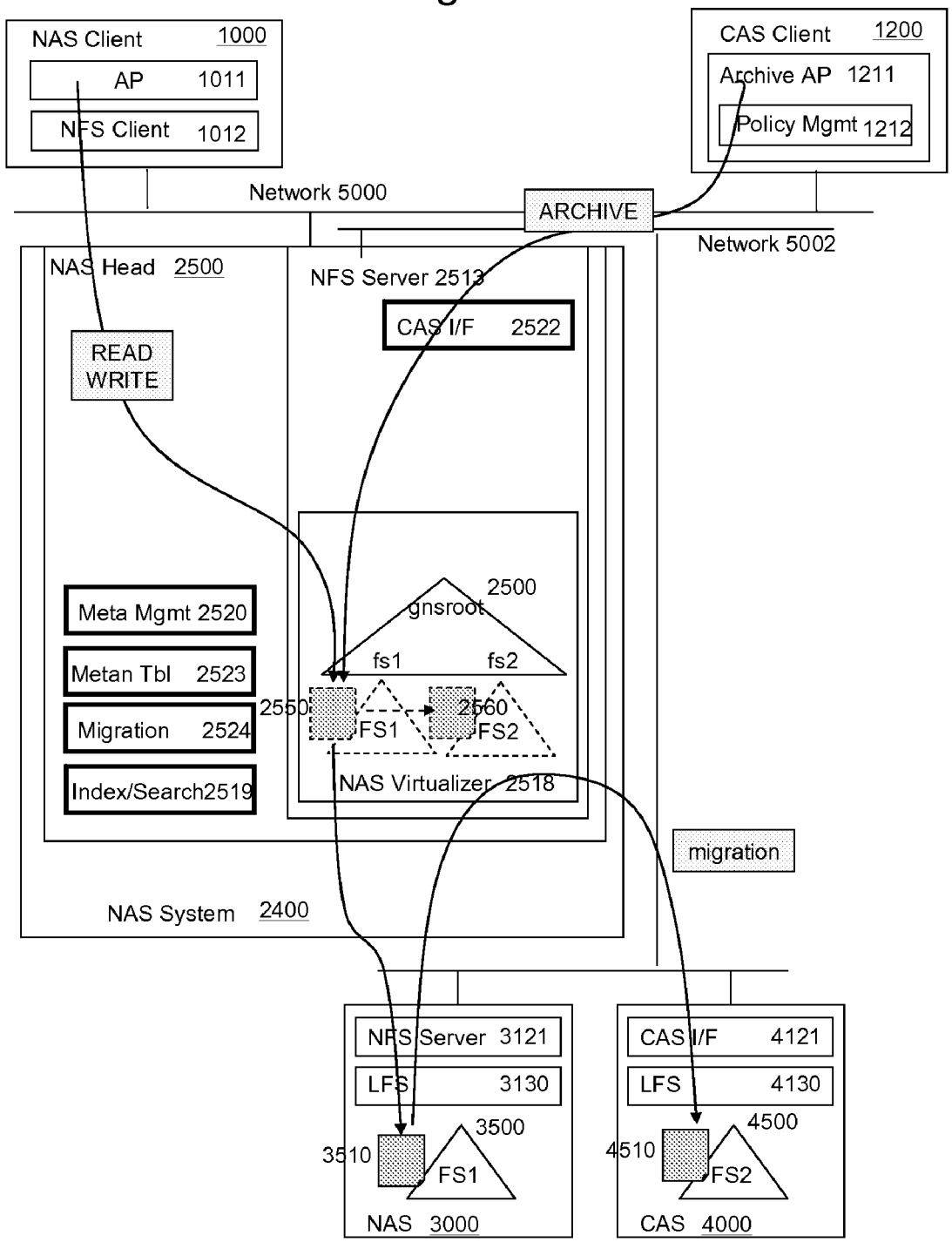
FIG. 11 illustrates a conceptual diagram of archiving a file using an embodiment of the invention.

The description will now proceed to a second embodiment, wherein the name space of CAS 4500 can be seen in GNS 2500 from the NAS client 1000 and CAS client 1200. In this case the NAS client and CAS client can directly manipulate the file on CAS 4000. FIG. 11 shows a conceptual diagram of archiving a file using the second embodiment of the invention. A file system 1 (FS1) at NAS 3000 and a file system 2 (FS2) at CAS 4000 are a part of GNS 2500. Then, the NAS client application 1011 on NAS 1000 and archive application 1211 on CAS client 1200 can access files in the FS1 via the path of "/gnsroot/fs1/" and FS2 via the path of "/gnsroot/fs2/". In the following explanation, the archive target of the FS1 is file system 2 (FS2) or name space 2 at CAS 4000.

An example of control procedure for archiving a file 2550 on NAS to CAS is similar to FIG. 6.

1. (Same as 10010) Based on archiving policies 1212, which an administrator sets, archive application 1211 requests archiving a file on GNS through CAS I/F program 2522. The typical parameters of the command are retention period, file path name 2550 on GNS, target path name 2560 on CAS (optionally), and custom metadata for archiving.
2. (Same as 10020) When CAS I/F program 2522 receives the archive request, it invokes metadata management program 2520.
3. (Same as 10030) Metadata management program 2520 adds default metadata to an archived file in addition to designated metadata by the archive application 1211.
4. (Same as 10040) Metadata management program 2520 invokes migration program 2524.
5. (Same as 10050) Migration program 2524 copies the file from designated path 2550 on GNS 2500 to an appropriate location 2560 on GNS. The actual location of the source file is 3510 on NAS 3000, and the actual location of the target file is 4510 on CAS 4000. The target location on CAS can be specified by an archive application 1211 or some default place such as the similar path name as the original file on GNS (e.g. "/gnsroot/fs1/a.doc"->"/gnsroot/fs2/a.doc"). Migration program 2524 also writes the default and custom metadata for the file to CAS 4000 via CAS I/F 4121. Then, the migration program changes a file attribute as read only. Here the migration program copies the file from NAS to CAS, and changes the file attributes as read only. However, the migration program can move the file from NAS to CAS, and leave a stub file or manage file location information similar to the File Location Table on NAS virtualizer. Since the file is moved, the available capacity of NAS 3000 can be increased. In this case, when the NAS client reads the archived file, the migration module hooks the NFS read operation, interprets the file location on CAS by looking up metadata management table or other location information table, and reads from CAS.
6. (Same as 10060) Migration program 2524 registers the location of the file 2560 on CAS 4000, and default and custom metadata into metadata management table 2523.
7. Migration program 2524 may optionally return the location of the file 2560 on CAS to the archive application 1211.
8. (Same as 10070) Migration program 2524 invokes Index/Search program 2529.
9. (Same as 10080) Index/Search program 2519 creates detailed index such as full text index instead of metadata index.

Figure 12:
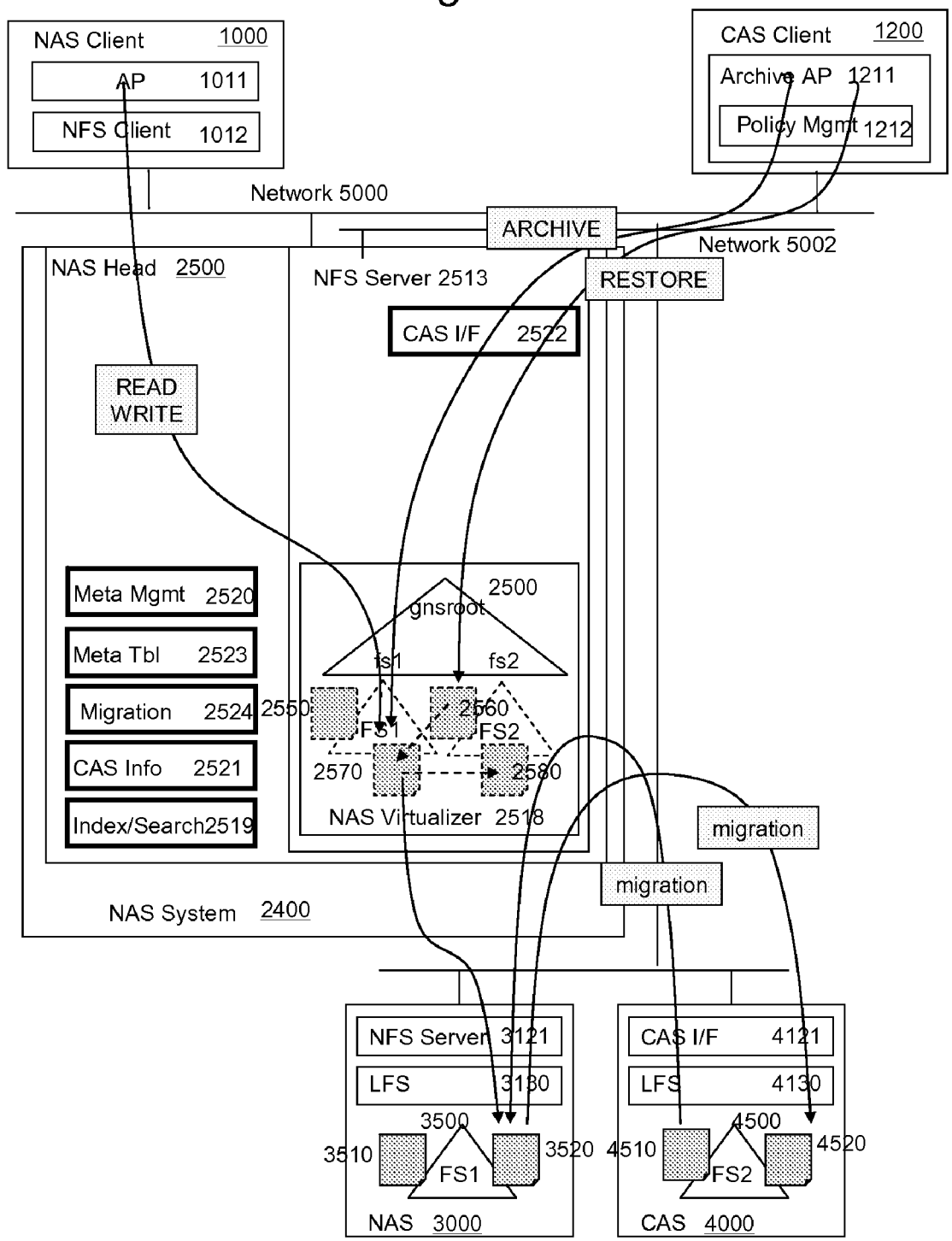
FIG. 12 illustrates a conceptual diagram of restoring an archived file using an embodiment of the invention.

In the second embodiment, archive application requests restoring an archived file 2560 by designating a file location 2560 on GNS, instead of the original file location 2550 on GNS (used in the first embodiment). FIG. 12 shows a conceptual diagram of restoring an archived file using the second embodiment of the invention. File system 1 (FS1) at NAS 3000 and file system 2 (FS2) are a part of GNS 2500. Then, the NAS client application 1011 on NAS 1000 and archive application 1211 on CAS client 1200 can access files in the FS1 via the path of "/gnsroot/fs1/" and in the FS2 via the path of "/gnsroot/fs2/". In the following explanation, the archive target of the FS1 is file system 2 (FS2) or name space 2 at CAS 4000. Since the original file 2550 is archived and should not be updated, the restoration target location should be different from the original location. Then, the archived file 4510 is copied to the different location on 2570 GNS 2500 (e.g. "/gnsroot/fs1/a_recover.doc). The recovery location can be determined by an archive application 1211 or be predetermined by an administrator. NAS client application 1011 and archive application 1211 reads and writes the restored file 2570 as the normal file on GNS.

FIG. 13 represents an example of control procedure of restoring an archived file from CAS to NAS base on the configuration of FIG. 12. The difference from FIG. 9 is that this embodiment does not need to resolve the file location (e.g. Step 12030), because the file location on CAS is specified. That is, since in this embodiment the CAS client can see the files archived in CAS system 4000, it can specify the file to be restored directly. Note that in the first embodiment the CAS system request the restoration by providing the identification of the original file, not the archived file, as in this embodiment.

1. Archive application 1211 requests restoring an archived file 2560 on GNS 2500 through CAS I/F 2522 of NAS System 2400 (Step 14010). The physical location of the file 2560 is 4510 on CAS 4000. The typical parameters are the file location 2560 on GNS and restoration target location 2570. Archive application knows the file 2560 has already been archived because of its path name.
2. When CAS I/F program 2522 receives the restoration request, it invokes migration program 2524 (Step 14020).
3. Migration program 2524 reads the file 2560, and writes it to designated path 2570 on GNS (Step 14030). The physical location of the file 2570 is 3520 on NAS 3000. The target location might not be specified by the archive application 1211. In this case, the migration program 2524 can determine the location based on the pre-determined location rule.
4. Migration program 2524 invokes CAS information program 2521 in order to register the restoration location 2570, and the original location 2560 or contents ID (Step 14040). To do this, the metadata of original file 2560 and detailed index can be utilized, and just the differential data (e.g. metadata and index) should be added to the original data at re-archiving.
5. Migration program 2524 may optionally return the location of the restored file 2560 on GNS to the archive application 1211, if the location was not specified by the archive application.

FIG. 15 shows an example of another control procedure of restoring an archived file from CAS to NAS base on the configuration of FIG. 12. The restoration is invoked when the NAS client application 1101 instead of an archive application copies the archived file 2560 to NAS.

1. NAS client application 1011 requests copying an archived file 2560 to NAS (Step 16010).
2. If NAS client application employs normal NFS command for coping, NFS server program 2522 hooks the copy request, and invokes migration program 2524 (Step 16020).
3. If NAS client application employs CAS command for restoration, CAS I/F program 2522 hooks the restoration request, and invokes migration program 2524 (Step 16025).
4. Migration program 2524 reads the file 2560, and writes it to designated path 2570 on GNS (Step 16030).
5. Migration program 2524 invokes CAS Information program 2521 in order to register the restoration location 2570, and the original location 2560 or contents ID (Step 16040). To do this, the metadata of original file 2560 and detailed index can be utilized, and just the differential data (e.g. metadata and index) should be added to the original data at re-archiving.

FIG. 12 also shows a conceptual diagram of re-archiving a restored file using the invention. The archive of restored file 2570 is almost the same as the normal file archiving. The difference is that the stored metadata and detailed index of the original file can be utilized at the creation of the metadata and detailed index.

FIG. 14 shows an example of control procedure of re-archiving a restored based on the configuration of FIG. 12.
1. (Same as 10010) Archive application 1211 requests re-archiving a file 2570 on GNS through CAS I/F program 2522 (Step 15010). The typical parameters of the command are retention period, source file path name 2570, target path name 2580, and custom metadata for archiving.
2. (Same as 10020) When CAS I/F program 2522 receives the archive request, it invokes metadata management program 2520 (Step 15020).
3. Metadata management program 2520 invokes CAS information program 2521, and resolve the location of archived file 4510 from the location of restored file 2570. Then, the Metadata management program reads the original metadata, and adds designated new or updated metadata by the archive application to the original metadata (Step 15030).
4. (Same as 10040) Metadata management program 2520 invokes migration program 2524 (Step 15040).
5. (Same as 10050) Migration program 2524 copies the file from designated path 2570 to a designated target location 2580. The physical location of 2580 is 4520 on CAS 4000. Then, the actual file write operation is done via CAS I/F 4121. Migration program 2524 also writes the default and custom metadata for the file to CAS 4000 via CAS I/F 4121. Then, the migration program changes a file attribute as read only (Step 15050).
6. (Same as 10060) Migration program 2524 registers the location of the file 2580, and default and custom metadata into metadata management table 2523 (Step 15060).
7. Migration program 2524 may optionally return the location of the file 4520 on CAS to the archive application 1211.
8. (Same as 10070) Migration program 2524 invokes Index/Search program 2529 (Step 15070).
9. Index/Search program 2519 invokes CAS Information program 2521, and finds the original path 2550 for the file 2570 from the location of archived file 2560 by using metadata management table 2523. Index/Search program copies the detailed index for the original file 2550, and adds index for the differential data (Step 15080).

Figure 16:
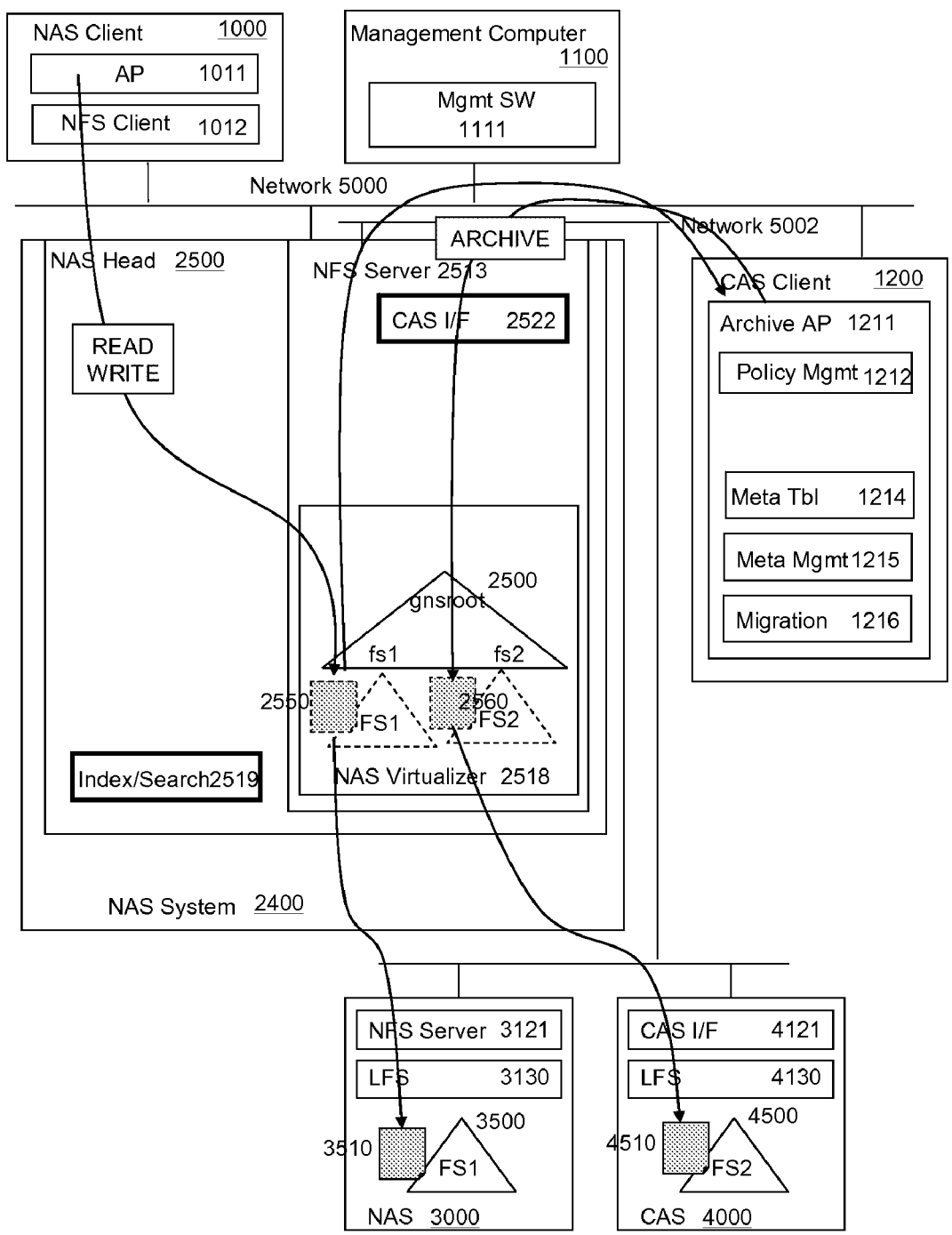
FIG. 16 illustrates a conceptual diagram of one example where index/search functionality is embedded in NAS.

In the above embodiments almost all the functionalities of the archive application, but policy management, were offloaded from the archive application to NAS 2400. However, there are various options of functionalities to be offloaded. In one extreme case, all functionalities can be offloaded to NAS, and the archiving application can be embedded on NAS 2400. On the other hand, many functionalities of archive application can remain on the archive application on the CAS client. For example, FIG. 16 represents a conceptual diagram of one example wherein only the index/search functionality is embedded in NAS 2400. File system 1 (FS1) at NAS 3000 and file system 2 (FS2) are a part of GNS 2500. Then, the NAS client application 1011 on NAS 1000 and archive application 1211 on CAS client 1200 can access files in the FS1 via the path of "/gnsroot/fs1/" and in the FS2 via the path of "/gnsroot/fs2/". The archive target of the FS1 is file system 2 (FS2) or name space 2 at CAS 4000. Archiving, restoring, and re-archiving under such conditions will be illustrated with respect to a third embodiment of the invention.

In the third embodiment, the name space of CAS 4500 can be seen in GNS 2500 from the NAS client 1000 and CAS client 1200. Then, the NAS client and CAS client can directly manipulate the file on CAS 4000. However, the notion can be applicable to the case that the name space of CAS 4500 cannot be seen in GNS 2500 such as the first embodiment.

FIG. 17 shows an example of control procedure of file archiving based on the configuration of FIG. 16.
1. Based on archive policies 1212, which an administrator sets, archive application 1211 reads a file on 2550 GNS (Step 17010).
2. Metadata management program 1215 adds default metadata to the file in addition to designated metadata by an administrator (Step 17020).
3. Metadata management program 1215 invokes migration program 1216 (Step 17030).
4. Migration program 1216 requests writing the read file and metadata on CAS 4000 through CAS I/F 2522 on NAS 2400 (Step 17040). The target location on CAS can be specified by an archive application 1211 or some default place such as the same path name as the original file on GNS (e.g. "/gnsroot/fs1/a.doc"->"/gnsroot/fs2/a.doc"). The migration program changes a file attribute as read only. Here the migration program copies the file from NAS to CAS, and changes the file attributes as read only. However, the migration program can move the file from NAS to CAS, and leave a stub file or manage the file's location information similar to the File Location Table on NAS virtualizer. Since the file is moved, the available capacity of NAS 3000 can be increased. In this case, when the NAS client reads the archived file, the NFS server program 2513 hooks the NFS read operation, interprets the file location on CAS by looking up metadata management table 1214 on archive application 1211 or other location information table managed by NAS 2400, and reads from CAS.
5. CAS I/F program 2522 on NAS 2400 writes the file and metadata on CAS 4000, and returns the location information to the archive application (Step 17050).
6. CAS I/F program 2522 invokes Index/Search program 2519 (Step 17060).
7. Index/Search program 2519 on NAS 2400 creates detailed index (Step 17070).

8. Migration program 1216 registers a location of the archive file 2560, and metadata into metadata management table 1214 (Step 17080).

As can be understood from the above description of embodiments of the invention, this invention provides an improved management of NAS and CAS archiving, restore, and re-archiving operations using the GNS facility. Using the invention, an effective NAS/CAS integration with GNS is enabled, while retaining the required functionality of CAS, including CAS policies, such as retention periods and indexing to enable CAS access and search. In some implementations much of the facilities are provided onto the NAS system, so that it performed archiving, restoration, and re-archiving by a simple call request from the CAS client. In other implementations the majority of the functionalities can reside with the CAS client, while the NAS system is used to provide mainly the GNS naming facility.

By implementing embodiments of the invention, this invention can provide improved access to files in CAS system by using GNS facility. Notably, the metadata of a file on CAS is maintained, but is linked to a GNS path. In this manner, the file may be recalled using its GNS path, but the requirement of maintaining a metadata for the file is retained. In one embodiment, by utilizing GNS location transparency features from clients, NAS and CAS clients keep using original file pathname after archiving the file (i.e. migrating from NAS to CAS). In another embodiment, not using GNS location transparency features, NAS and CAS clients can distinguish archived file pathname from original pathname. Moreover, some features such as the metadata addition and file migration are offloaded to NAS from a CAS client.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A method for managing files stored in a storage system, wherein the storage system includes a content addressable storage (CAS) system and CAS client and network attached storage (NAS) system and NAS client, comprising:
    a. providing global name space facility in the NAS system;
    b. providing an archiving application in the CAS client;
    c. providing CAS interface facility in the NAS system;
    d. operating the archiving application to monitor a policy management facility and, when a management event is flagged by the policy management facility, sending a file management request of a target file from the archiving application to the CAS interface;
    e. operating the CAS interface to receive file management requests from the archiving application, interpret the requests, and in response invoke a migration module; and,
    f. operating the migration module to execute the file management request on the target file via the NAS system to thereby provide a GNS path to the target file;
        wherein the file management request comprises a file archiving of the target file, and the method further comprises operating the NAS system to store an archive copy of the target file from an original NAS storage location to a target archive location on the CAS system via the GNS facility, and storing in a metadata table a GNS path to the target location.

2. The method of claim 1, further comprising:
    providing a metadata management facility and, upon receiving the file management request invoking the metadata management facility to insert default metadata and designated metadata to the target file.

3. The method of claim 2, further comprising incorporating the designated metadata in the file management request to thereby provide the designated metadata to the metadata management facility.

4. The method of claim 3, further comprising using the metadata management facility to maintain the metadata management table.

5. The method of claim 4, further comprising: for each file maintaining in the metadata management table at least the entries comprising GNS path, CAS node, CAS oath, default metadata, and custom metadata.

6. The method of claim 5, further comprising providing an index/search facility and upon receiving a file management request invoking the index/search facility to create an index for the target file.

7. The method of claim 1, further comprising modifying an editing attribute of the archive copy to a read only attribute.

8. The method of claim 7, further comprising sending from the archiving application a subsequent file management request comprising a file restore of the archive copy, and operating the NAS system to store a restored copy of the archive file from the target archive location to a target restore location on the NAS system via the GNS facility, wherein the target restore location is different from the original NAS storage location.

9. The method of claim 8, wherein when the file management request comprises a file restore of the archive copy, the method further comprises storing a pointer to metadata and index of the archive copy.

10. The method of claim 9, further comprising sending from the archiving application a subsequent file management request comprising a file re-archiving of the restored copy, and operating the NAS system to store a re-archive copy of the restored file from the target restore location to a target re-archive location on the CAS system via the GNS facility, wherein the target re-archive location is different from the target archive location.

11. The method of claim 10, wherein upon re-archiving of the restored copy, the pointer is utilized to fetch the metadata and index of the archive copy, and the metadata and index of the archive copy are modified to reflect edits embodied in the re-archived copy.

12. A network attached storage (NAS) system enabling storage of files using global name space (GNS) and maintaining content addressable storage (CAS) policy, comprising:
- a network interface for exchanging communication with network clients;
- a storage interface for exchanging communication with a storage controller;
- a processor for executing file management operations;
- a NAS virtualizer providing a GNS facility;
- a CAS interface for receiving file management requests for target files from a CAS archive application, and causing the processor to execute the file management requests on the target files to generate managed files, and providing GNS path for each managed file by the NAS virtualizer;
- wherein the file management request comprises a file archiving of the target file, and
- wherein the NAS system stores an archive copy of the target file from an original NAS storage location to a target archive location on the CAS system via the GNS facility, and stores in a metadata table a GNS path to the target location.

13. The storage system claim 12, further comprising an index/search module generating an index for each managed file.

14. The storage system of claim 13, further comprising a migration module, the migration module being invoked upon receiving each of the file management request to execute copying of the target file.

15. The storage system of claim 14, further comprising a metadata management module providing default metadata and designated metadata to each of the managed files.

16. The storage system of claim 15, wherein the metadata table is operative for storing metadata, CAS path, and GNS path of each of the managed files.

17. The storage system of claim 16, wherein each of the file management requests comprise one of file archiving, file restoration, and file re-archiving.

18. A networked storage system enabling storage of files using global name space (GNS) and maintaining content addressable storage (CAS) policy, comprising:
- a network attached storage (NAS) system comprising:
    - a plurality of storage volumes;
    - a storage controller managing operation of the plurality of storage volumes;
    - a NAS head managing files stored in the plurality of storage volumes, the NAS head comprising a GNS facility providing a GNS path for each file managed by the NAS head, the NAS head further comprising a CAS interface receiving and interpreting file management requests from CAS clients;
- a CAS system comprising a plurality of CAS storage volumes;
- a CAS client comprising a policy management facility managing CAS files stored in the CAS storage volumes, the CAS client further comprising an archive application monitoring the policy management facility and providing file management requests to the NAS system;
- wherein the file management request comprises a file archiving of the target file, and
- wherein the NAS system stores an archive copy of the target file from an original NAS storage location to a target archive location on the CAS system via the GNS facility, and stores in a metadata table a GNS path to the target location.

19. The storage system of claim 18, wherein the NAS head further comprises at least one of:
- a metadata management module providing default metadata and designated metadata to each managed file;
- a metadata table storing metadata, CAS path, and GNS path of each of the managed files;
- an index/search module generating an index for each managed file; and,
- a migration module that migrates a file from NAS to CAS or from CAS to NAS.

\* \* \* \* \*